United States Patent [19]

Smith

[11] Patent Number: 4,787,579
[45] Date of Patent: Nov. 29, 1988

[54] GAS THRUSTER

[75] Inventor: Peter Smith, Portsmouth, England

[73] Assignee: The Marconi Company Limited, England

[21] Appl. No.: 43,850

[22] Filed: Apr. 29, 1987

[30] Foreign Application Priority Data

May 2, 1986 [GB] United Kingdom ............... 8610849

[51] Int. Cl.⁴ .................................................. B64G 1/26
[52] U.S. Cl. ................................ 244/169; 60/39.12; 60/207; 60/260; 60/736
[58] Field of Search .................. 244/172, 169, 158 R; 60/39.12, 39.19, 39.181, 251, 257, 267, 39.48, 260, 736

[56] References Cited

U.S. PATENT DOCUMENTS

| | | | |
|---|---|---|---|
| 3,097,480 | 7/1963 | Sohn | 244/169 |
| 3,170,290 | 2/1965 | Webb | 60/39.19 |
| 3,520,137 | 7/1970 | Newman et al. | 244/169 |
| 3,732,693 | 5/1973 | Chu | 60/207 |
| 4,101,294 | 7/1978 | Kimura | 60/39.12 |
| 4,288,051 | 9/1981 | Goschel | 244/169 |
| 4,635,885 | 1/1987 | Hujsak | 244/169 |

OTHER PUBLICATIONS

"Some Cold Gas Auxiliary Jet Control Mechanisms and Propellants for Use in Earth Satellites", by B. P. Day and R. Hastings, Jun. 1961.

Primary Examiner—Galen Barefoot
Attorney, Agent, or Firm—Kirschstein, Kirschstein, Ottinger & Israel

[57] ABSTRACT

A thruster system has a main bipropellant propulsion unit including a propulsion engine (50) and bipropellant supply having a tank (3) for an oxidizing agent and a tank (4) for a fuel. An auxiliary cold propellant thruster (21) uses propellant supplied by bleeding off vapor from the contents of the oxidizing agent tank (3).

5 Claims, 1 Drawing Sheet

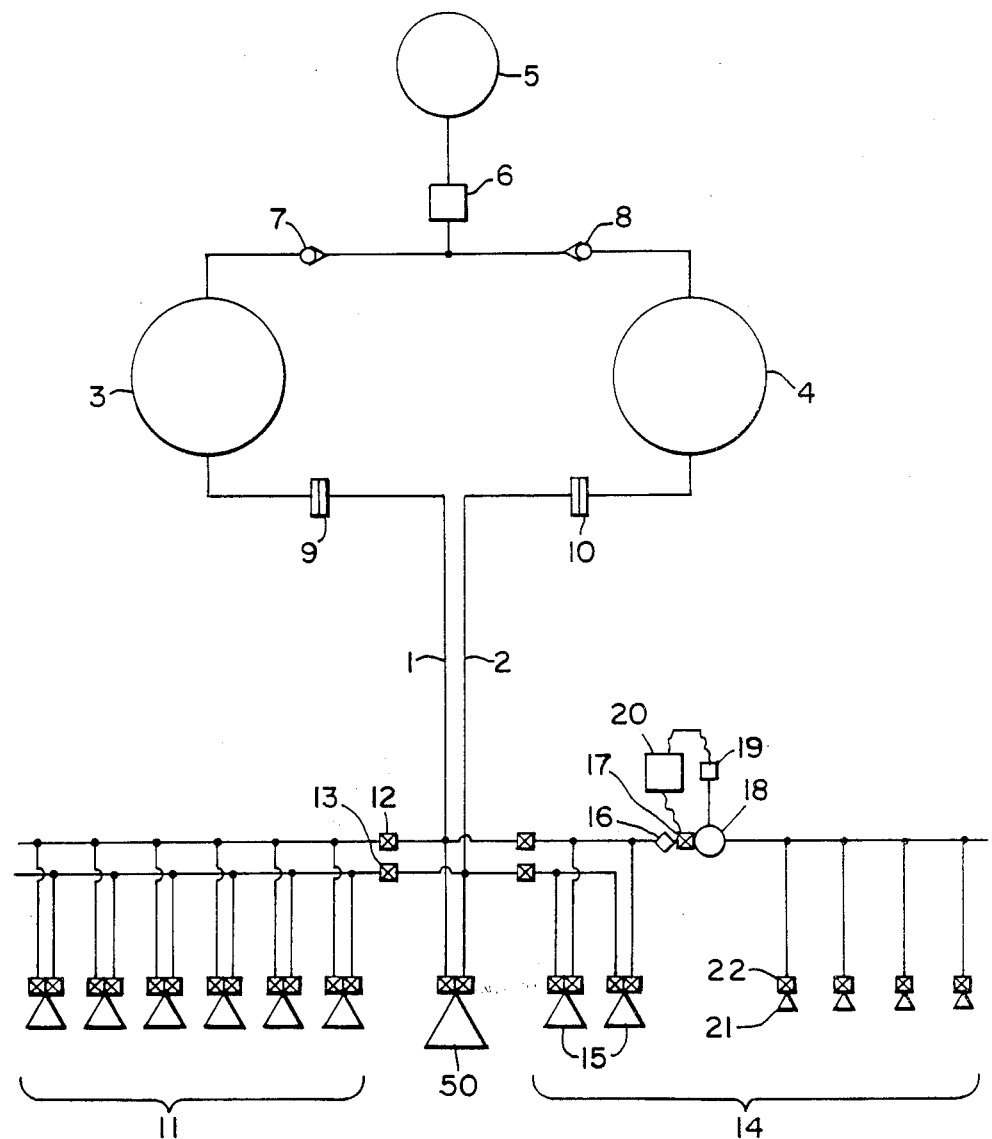

GAS THRUSTER

BACKGROUND OF THE INVENTION

1. Field of the Invention

The present invention concerns thruster systems for spacecraft. It is particularly, though not exclusively, concerned with thruster systems for carrying out requirements such as orbital manoeuvres, station keeping and attitude control.

2. Description of Related Art

Conventionally bipropellant thrusters are used which combine an oxidiser with a fuel for their propulsive effect. One commonly used oxidiser is dinitrogen tetroxide ($N_2O_4$) whilst fuels used are hydrazine or hydrazine derivatives.

A problem arises in that thrusters of this type tend to produce more thrust than is necessary for attitude control requirements. Because of this spacecraft are often fitted with reaction or momentum wheels to provide fine control and to minimise the effect of relatively high thrust levels.

SUMMARY OF THE INVENTION

The present invention has for an object to meet this disadvantage.

Accordingly the present invention consists in a thruster system for a spacecraft comprising a main bipropellant propulsion system including a propulsion engine and a bipropellant supply having a tank for an oxidiser and a tank for a fuel, and wherein the system includes a subsidiary cold propellant thruster the propellant for which is supplied by bleeding off vapour from the contents of the oxidizer tank.

BRIEF DESCRIPTION OF THE DRAWING

In order that the invention may be more readily understood, an embodiment thereof will now be described by way of example and with reference to the single FIGURE of the accompanying drawing which is a diagrammatic view of a bipropellant thruster system incorporating the present invention.

DETAILED DESCRIPTION OF THE PREFERRED EMBODIMENT

Referring now to the drawing, there is shown on one side of the figure a typical known bipropellant propulsion system. The known system includes a manoeuvring engine 50, connected directly by respective liquid propellant conduits 1, 2 to an oxidiser tank 3 and a fuel tank 4. The required system pressure is maintained in tanks 3 and 4 by a pressurant, stored in a tank 5 and acting via a pressure regulator 6 and respective check values 7 and 8. The conduits 1 and 2 are normally fitted with filters 9 and 10.

A typical bipropellant system normally includes two sets of attitude and orbit control thrusters, of which one set is shown at 11. Each set may be isolated using isolation valves 12 and 13. The set of attitude and orbit control thrusters shown in the second set 14 incorporate the present invention. Two conventional thrusters 15 are also shown in this modified set. In this embodiment the oxidiser in tank 3 is dinitrogen tetroxide and the fuel in tank 4 is hydrazine. In operation dinitrogen tetroxide enters an orifice 16 or similar device to reduce the system pressure. The oxidiser then flows through a control valve 17 and into a vapourising chamber 18 to produce nitrogen dioxide. The vapourising chamber 18 is fitted with a pressure sensor 19 which monitors the pressure in the chamber, and a temperature sensor (not shown). The chamber and subsequent downstream conduits which carry the nitrogen dioxide vapour may be wrapped with heaters to maintain the propellant in its vapour state.

The output from the pressure sensor 19 is monitored in control electronics 20 which are fitted with a limit switch and valve driver. When the pressure sensor 19 indicates a pressure below a set limit, the limit switch is operated and this activates the valve driver which drives the valve 17 into the 'open' position. Propellant then flows into the vapourising chamber 18 and on vapourising produces an increase in pressure which is monitored by the pressure sensor. The limit switch operating requirement may then be exceeded and valve 17 returned to its 'closed' position.

The vapourised propellant is exhausted through a divergent nozzle 21 to provide thrust. Control of the thruster is maintained by a thruster inlet valve 22.

As can be seen in this embodiment the vapourising chamber 18 is remote from the thrusters. An alternative to this is to provide hydrophobic membranes immediately upstream of each cold propellant thruster inlet valve. Each such membrane will act to provide a liquid/vapour barrier so long as the volume between the membrane and the valve is heated and the liquid pressure on each membrane restricted to 2 bar. Thus the liquid system pressure has to be reduced and this may be done by an arrangement similar to that shown in the drawing, namely an orifice, valve, pressure sensor and control electronics.

In the embodiment described a thruster exhaust velocity of at least 600 m/s can be achieved at a propellant temperature of 25° C. Very fine control can also be achieved.

Whilst the invention may be most conveniently applied to dinitrogen tetroxide, or the mixed oxides of nitrogen commonly used in space systems, in theory the concept of the invention can be applied to any fluid in board a spacecraft.

I claim:

1. A thruster system for a spacecraft of the type including a main bi-propellant propulsion system having a propulsion engine and a bi-propellant supply for the engine which has a tank for a liquid oxidizing agent and a tank for a liquid fuel, the thruster system comprising: a subsidiary cold propellant thruster; a supply line leading from the oxidizing agent tank to said cold propellant thruster; pressure reducing means in the supply line for reducing pressure therein; a control valve in the supply line for controlling the flow of liquid oxidizing agent along the supply line; and means in the supply line for vaporizing the liquid oxidizing agent prior to delivery of vaporized oxidizing agent to the cold propellant thruster.

2. A system as claimed in claim 1, wherein the vaporizing means includes a chamber fitted with a pressure sensor for monitoring pressure in the chamber.

3. A system as claimed in claim 2, and further including control means connected to the pressure sensor for controlling the pressure in said chamber.

4. A system as claimed in claim 1 wherein the thruster has an inlet valve associated with a hydrophobic membrane acting as a liquid vapor barrier.

5. In a spacecraft of the type including a main bi-propellant propulsion system having a main propulsion engine and means for supplying both liquid fuel and liquid oxidizer at a system pressure to the main engine to produce thrust, an attitude and orbit control thruster arrangement comprising:

(a) at least one subsidiary cold propellant thruster;
(b) means for conveying the liquid oxidizer along a conduit toward the subsidiary thruster;
(c) means for reducing the system pressure in the conduit;
(d) means for controlling the flow of the liquid oxidizer along the conduit;
(e) means for vaporizing the liquid oxidizer prior to conveyance to the subsidiary thruster; and
(f) means for delivering vaporized oxidizer to the subsidiary thruster to provide a fine attitude and orbit control for the spacecraft.

* * * * *